(12) United States Patent
Bae et al.

(10) Patent No.: US 8,031,624 B2
(45) Date of Patent: Oct. 4, 2011

(54) ENHANCED DATA TRANSPORT SYSTEM AND METHOD FOR MOBILE TERMINAL

(75) Inventors: Jong-Cheol Bae, Daegu Metropolitan (KR); Soon-Jin Kim, Daegu Metropolitan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 984 days.

(21) Appl. No.: 11/780,780

(22) Filed: Jul. 20, 2007

(65) Prior Publication Data

US 2008/0107079 A1 May 8, 2008

(30) Foreign Application Priority Data

Nov. 6, 2006  (KR) .................. 10-2006-0108654

(51) Int. Cl.
*H04L 12/26* (2006.01)
(52) U.S. Cl. .................. 370/252; 370/253; 370/331
(58) Field of Classification Search .................. 370/331, 370/332, 333, 236, 252, 253; 455/436–439, 455/566
See application file for complete search history.

(56) References Cited

U.S. PATENT DOCUMENTS

| | | | | |
|---|---|---|---|---|
| 5,828,659 A * | 10/1998 | Teder et al. | ................... | 370/328 |
| 6,131,030 A * | 10/2000 | Schon et al. | .................. | 455/438 |
| 6,600,758 B1 * | 7/2003 | Mazur et al. | .................. | 370/508 |
| 6,961,559 B1 * | 11/2005 | Chow et al. | ................ | 455/414.1 |
| 7,209,480 B2 * | 4/2007 | Ikeda | ............................ | 370/389 |
| 7,519,372 B2 * | 4/2009 | MacDonald et al. | ...... | 455/456.1 |
| 2004/0127163 A1 * | 7/2004 | Schramm et al. | .......... | 455/67.11 |
| 2007/0197260 A1 * | 8/2007 | Randall et al. | ................ | 455/557 |

* cited by examiner

*Primary Examiner* — Cong Tran
(74) *Attorney, Agent, or Firm* — H.C. Park & Associates, PLC (57) ABSTRACT

An enhanced data transport system and method for a mobile terminal are provided that may improve transmission rates. A data transport system for a mobile terminal includes a radio frequency unit, a data processing unit, a memory unit, and a control unit. The radio frequency unit establishes a radio frequency channel on the basis of a transmission control protocol parameter received from a mobile communication network. The data processing unit performs encoding/decoding and modulation/demodulation on signals to be transmitted or received through the radio frequency unit. The memory unit stores routines to execute a communication session and the transmission control protocol parameter. The control unit controls signal flows among the radio frequency unit, the data processing unit, and the memory unit, and configures a data transmission scheme according to the transmission control protocol parameter.

4 Claims, 8 Drawing Sheets

ENHANCED DATA TRANSPORT SYSTEM AND METHOD FOR MOBILE TERMINAL

CROSS REFERENCE TO RELATED APPLICATION

This application claims priority from and the benefit of Korean Patent Application No. 10-2006-0108654, filed on Nov. 6, 2006, which is hereby incorporated by reference for all purposes as if fully set forth herein.

BACKGROUND OF THE INVENTION

1. Field of the Invention

The present invention relates to a mobile terminal and, in particular, to an enhanced data transport system and a method for a mobile terminal that may provide for an improved transmission rate with fewer errors.

2. Discussion of the Background

In a wireless communication system, information is transmitted via a wireless interface. Such a wireless interface is defined by a wireless protocol and thus, subscriber terminals communicate data with each other based on the wireless protocol. The wireless protocol is developed considering various factors, such as network characteristics including network facilities, terminals, communication environment, and traffic characteristics. Since the 1990's, with the exponential growth of Internet population and usage, Internet traffic has increased dramatically. The majority of internet traffic is Transmission Control Protocol (TCP) traffic carrying data generated by various application programs, such as the World Wide Web (WWW), Teletype Network (TELNET), File Transfer Protocol (FTP), and the like.

In an Internet protocol suite, TCP operates above Internet Protocol (IP) and guarantees reliable and in-order data delivery. TCP uses a sliding window mechanism to control transmission of packets. With the sliding window mechanism, a sender can send a series of packets without acknowledgement. A sender's congestion window and a receiver's advertise window determine the size of the sliding window and a receiver's current buffer size determines the size of its advertise window. The congestion window performs its congestion control.

In a wireless communication system, TCP window size is fixed in accordance with the characteristics of the network. That is, most conventional wireless communication systems use a preset window size for data transmission. In such a case, changes in network characteristics may decrease efficiency. The conventional mobile communication system may be an IS-95A, an IS-95B, a Code Division Multiple Access (CDMA) 1x, a CDMA 1x Evolution Data Optimized (CDMA 1x EVDO), a Wideband CDMA (WCDMA), a Global System for Mobile communication (GSM), or a General Packet Radio Service (GPRS) system. Such mobile communication systems use different packet sizes.

In the current mobile communication systems, a mobile terminal requests transmission and reception of data packets in accordance with preset data transmission environments. Accordingly, data transmission through preset fixed size packets without considering the network characteristics pushes conventional mobile communication systems into pitfalls, such as data loss when high speed burst data passes a low speed network, and inefficient network use when low speed data passes a high speed network.

SUMMARY OF THE INVENTION

The present invention provides a data transport method for a mobile terminal that may allow for transmission rates to adapt to changes in network characteristics and environment.

The present invention also provides an enhanced data transport system that may be capable of adapting a transmission rate according to network characteristics and environment.

Additional features of the invention will be set forth in the description which follows, and in part will be apparent from the description, or may be learned by practice of the invention.

The present invention discloses a data transport method including receiving a transmission control protocol parameter from a mobile communication network, configuring a data transmission scheme from the transmission control protocol parameter, and establishing a communication channel with the mobile communication network based on the data transmission scheme.

The present invention also discloses a data transport method including maintaining a communication channel established with a serving network using a first parameter received from the serving network, deciding a handover from the serving network to a target network, and determining whether the target network is the same network as the serving network. The method further includes receiving, if the target network is not the same network as the serving network, a second parameter from the target network, reconfiguring a data transmission scheme of the mobile terminal based on the second parameter, and establishing a new communication channel with the target network.

The present invention also discloses a data transport system including a radio frequency unit, a data processing unit, a memory unit, and a control unit. The radio frequency unit establishes a radio frequency channel on the basis of a transmission control protocol parameter received from a mobile communication network. The data processing unit performs encoding/decoding and modulation/demodulation on signals to be transmitted or received through the radio frequency unit. The memory unit stores routines to execute a communication session and the transmission control protocol parameter. The control unit controls signal flows among the radio frequency unit, the data processing unit, and the memory unit, and configures a data transmission scheme according to the transmission control protocol parameter.

It is to be understood that both the foregoing and general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

In the present invention, the mobile terminal may include a Personal Digital Assistant (PDA), a laptop computer, a Smartphone, a $3^{rd}$ generation standard mobile terminal, a Code Division Multiple Access (CDMA) terminal, a Global System for mobile communication (GSM) terminal, a Global Packet Radio Services (GPRS) terminal, a Wireless Local Area Network (WLAN) terminal, a Wireless Broadband (WiBro) Terminal, or a High Speed Downlink Packet Access (HSDPA) terminal.

In the present invention, a base station to which a mobile terminal is connected is called a first base station or a serving base station, and a base station which the mobile terminal approaches is called a second base station or a target base station. The serving base station represents a communication network defined by the radio coverage of the serving base station, with which the mobile terminal is currently associated, and the target base station represents a communication network defined by the radio coverage of the target station, which the mobile terminal approaches. The serving base station and target base station provide the mobile terminal with system parameters. The system parameters include TCP parameters.

The data transport system and method are described with TCP. However, the present invention is not limited to TCP, but rather, may be implemented with other types of transport layer protocols having a flow control function. A data transmission policy between the mobile terminals may be decided on the basis of TCP parameters, such as window size and segment size. The parameters may be ones that influence the data transmission policy and are adjusted by the mobile terminals.

The data transport system and method are mostly described with regard to the receiving end of the mobile terminal; however, a transmission end of the mobile terminal is also involved. That is, the data transport may be controlled by adjusting both the transmission and reception window sizes of the mobile terminal.

In exemplary embodiments of the present invention, a Packet Zone identification (PZID) is used for extracting the TCP parameters from the system parameters. However, the present invention is not limited thereto and the TCP parameters may be gathered using other parameters.

Figure 1:
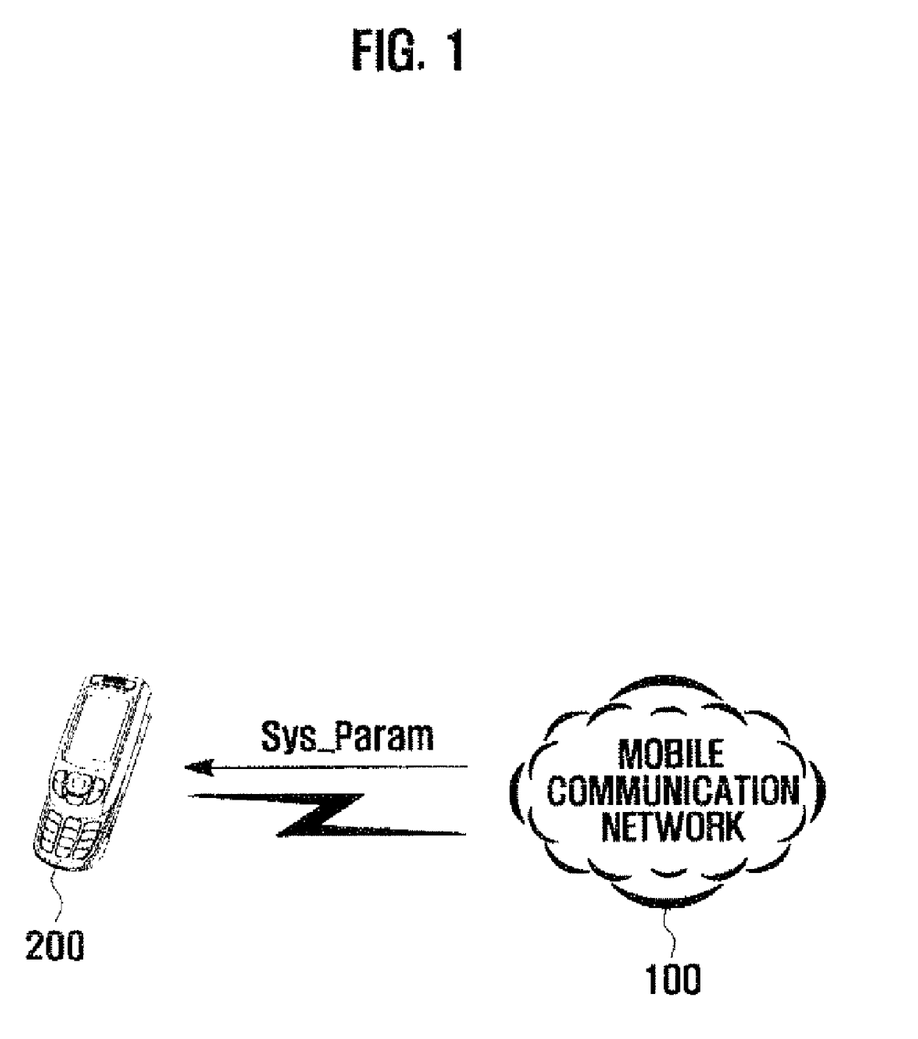
FIG. 1 is a schematic diagram showing an enhanced data transport system according to an exemplary embodiment of the present invention.

FIG. 1 is a schematic diagram showing an enhanced transport system according to an exemplary embodiment of the present invention.

Referring to FIG. 1, the enhanced data transport system includes a mobile communication network 100 and a mobile terminal 200 associated with the mobile communication network 100.

In the enhanced data transport system, the mobile terminal 200 collects system parameters Sys_Param transmitted from the mobile communication network and extracts TCP parameters from the system parameters. Among the TCP parameters, the mobile terminal checks the window size value and updates the transmission window size with reference to the received window size value such that the mobile terminal 200 establishes a communication channel with the mobile communication network 100 using the updated transmission window size. The TCP parameter is obtained by referring to the PZID of the system parameter. In this exemplary embodiment, the data transport policy may be changed by adjusting the message segment size value contained in an option field of a TCP header as well as the window size value. That is, the data transport policy may be decided by modifying at least one of the window size or the message size according to the network environment and characteristics.

Figure 2:
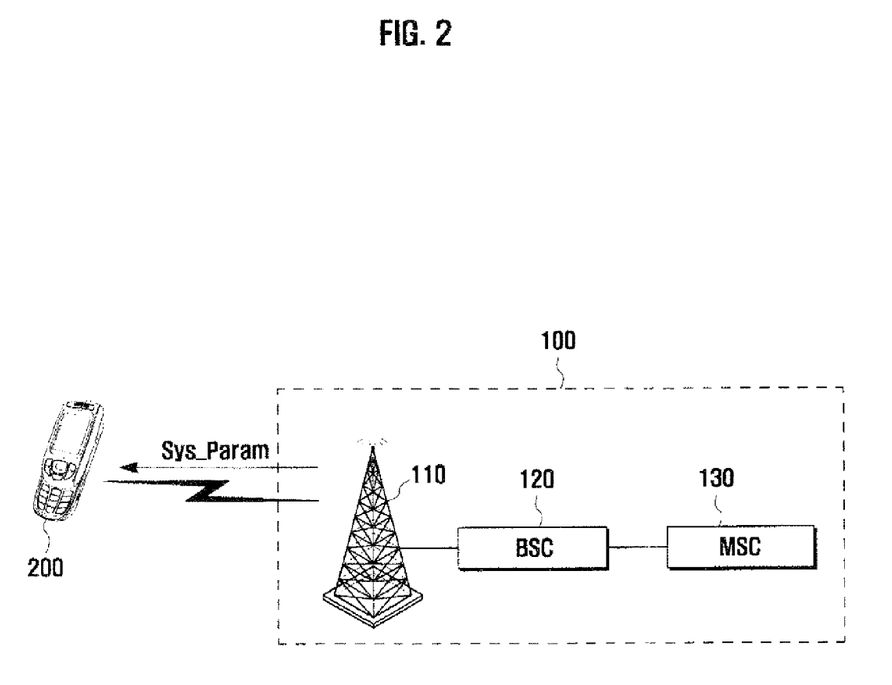
FIG. 2 is a block diagram showing a configuration of a mobile communication network in the enhanced data transport system of FIG. 1.

FIG. 2 is a block diagram showing a configuration of a mobile communication network in the enhanced data transport system of FIG. 1.

The mobile communication network may be one of an IS-95A, an IS-95B, a Code Division Multiple Access (CDMA) 1x, a CDMA 1x Evolution Data Optimized (CDMA 1x EVDO), a Wideband CDMA (WCDMA), a Global System for Mobile communication (GSM), a General Packet Radio Service (GPRS), and a Wireless Broadband (WiBro). A communication channel between the mobile terminal and the communication network 100 may be established on the basis of at least one of a CDMA, a Frequency Division Multiple Access (FDMA), a Time Division Multiple Access (TDMA), and an Orthogonal Frequency Division Multiple Access (OFDMA) scheme. In this exemplary embodiment, the data transport system utilizes CDMA.

Referring to FIG. 2, the mobile communication network 100 transmits a system parameter Sys_Param to the mobile terminal 200. The system parameter Sys_Param includes TCP information including at least one of a transmission window size, a reception window size, and a message size. The mobile communication network 100 includes a base station (BS) 110, a base station controller (BSC) 120, and a mobile switching center (MSC) 130.

The BS 110 establishes a communication channel with the mobile terminal 200 for exchanging voice and data. The BS 110 performs baseband functions and wire/wireless conversion, and operates as an edge router of the core network.

The BSC 120 is located between the BS 110 and the MSC 130 and manages the BS 110. The BSC 120 is responsible for managing the radio resources at the BS 110 and assigning channels to the mobile terminal 200, and controls handover of the mobile terminal 200 between BSs 110.

The MSC 130 is provided with a switch for supporting wire and wireless communication and provides call control and switching functionality. The MSC 130 also supports various supplementary services of the network and controls location registration, handover procedure, and interoperability with legacy and other networks.

In this exemplary embodiment, particularly, the MSC 130 generates a system parameter Sys_Param including a TCP parameter indicating a characteristic of the current network such as reception, transmission window size, or message size. The system parameter Sys_Param is referenced for deciding the actual window size and message size.

Figure 3:
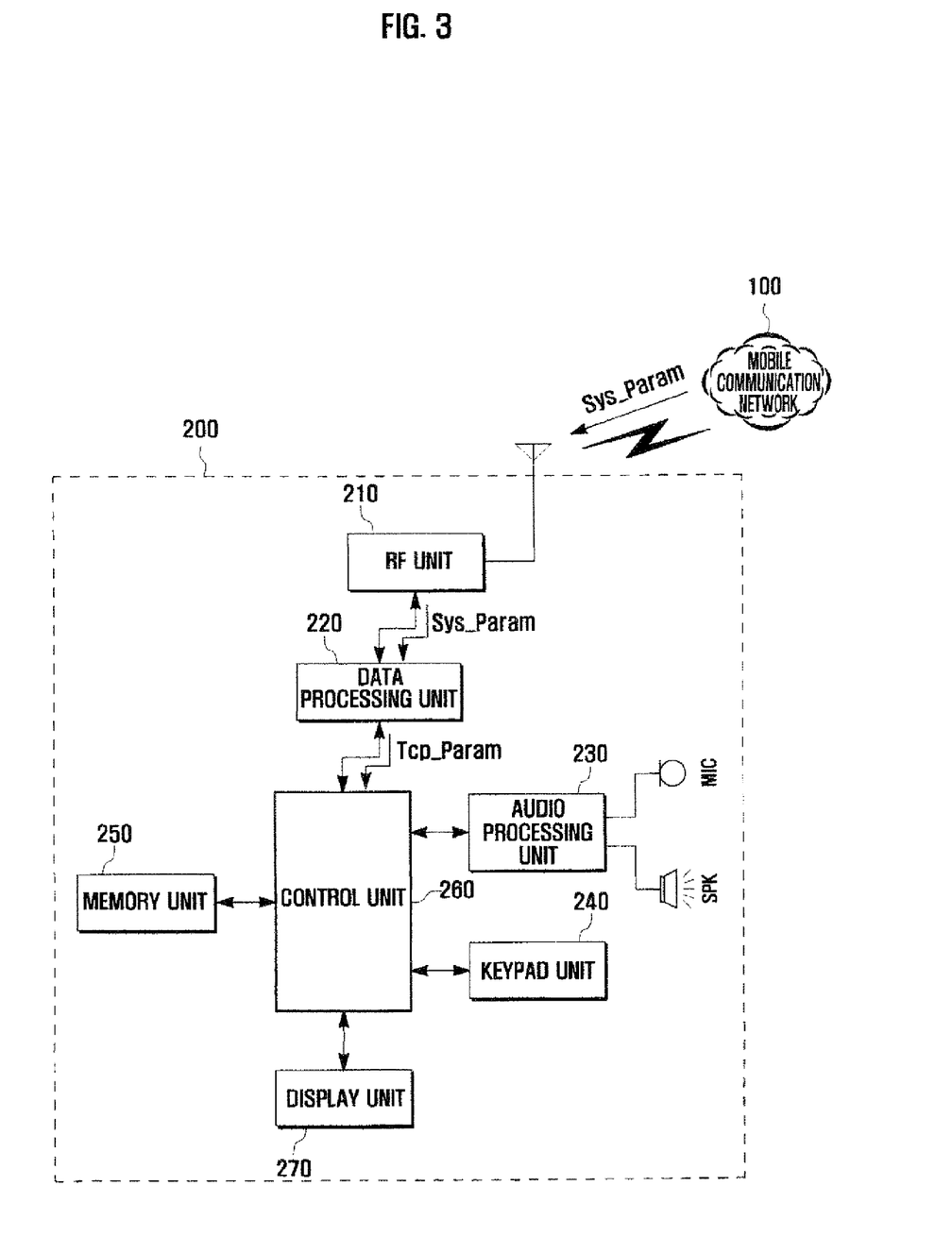
FIG. 3 is a block diagram showing a configuration of a mobile terminal of a data transport system according to an exemplary embodiment of the present invention.

FIG. 3 is a block diagram showing a configuration of a mobile terminal of a data transport system according to an exemplary embodiment of the present invention.

Referring to FIG. 3, the mobile terminal 200 includes a Radio Frequency (RF) unit 210, a data processing unit 220, an audio processing unit 230, a keypad unit 240, a memory unit 250, a display unit 270, and a control unit 260.

The RF unit 210 processes radio signals exchanged between the mobile terminal 200 and the base station 110. The RF unit 210 includes an RF transmitter for up-converting and amplifying a baseband signal to be transmitted and an RF receiver for low noise amplifying and down-converting a received radio frequency signal.

Particularly, the RF unit 210 is responsible for the establishment of a communication channel with the mobile communication network 100 through which the system parameter Sys_Param is transmitted by the BS 110. The communication channel may utilize at least one of CDMA, FDMA, TDMA, WCDMA, and OFDMA.

The data processing unit 220 may include a device for coding and modulating a signal to be transmitted to the mobile communication network 100 and a device for demodulating and decoding a signal received through the RF unit 210. The data processing unit 220 also extracts the system parameter Sys_Param from the received signal and forwards the extracted parameter, i.e. the TCP parameter Tcp_Param, to the control unit 160.

The audio processing unit 230 processes the audio data output from the data processing unit 220 and read from the memory unit 250 to output an audible sound wave through a speaker SPK, and processes the signal input through a microphone MIC to output the signal as audio data to the data processing unit 220.

The keypad unit 240 may be provided with a plurality of alphanumeric keys for furnishing user input data and various function keys for executing specific operations of the mobile terminal 200. Signals generated by the keys are delivered to the control unit 260. In this exemplary embodiment, particularly, the keypad unit 240 may produce a key signal for establishing a data communication channel between the mobile terminal 200 and the mobile communication network 100. For example, the keypad unit 240 generates a specific key signal for establishing a data communication channel and delivers the key signal to the control unit 260. The control unit 260 controls the establishment of the communication channel with the mobile communication network 100 in response to the key signal.

The memory unit 250 stores application data received from the mobile communication network 100 and user data temporarily or semi-permanently. The memory unit 250 includes program memory and data memory.

The program memory stores an operating system for controlling general operations of the mobile phone and program modules for performing data communication. That is, the program memory stores a TCP/IP module for establishing the data communication channel. In the case of a GSM/GPRS terminal, the program memory stores a Radio Link Control/Media Access Control (RLC/MAC) unit, a Subnetwork Dependent Convergence Protocol (SNDCP) unit, a GPRS Mobility Management (GMM) unit, other layer units enabling the control unit 260 to execute software routines, and a Logical Link Control (LLC) unit. That is, the program memory may store protocols and routines to execute those protocols for a communication standard adopted by the mobile terminal 200.

The data memory stores application data generated while the application programs operate, user configuration data, and the system parameter Sys_Param. The system parameter Sys_Param may be changed in accordance with a modification of the network type, network equipments, or access rate. The mobile terminal 200 updates the system parameter Sys_Param by periodically receiving data from the mobile communication network 100 or soliciting data to the mobile communication network 100.

Figure 4:
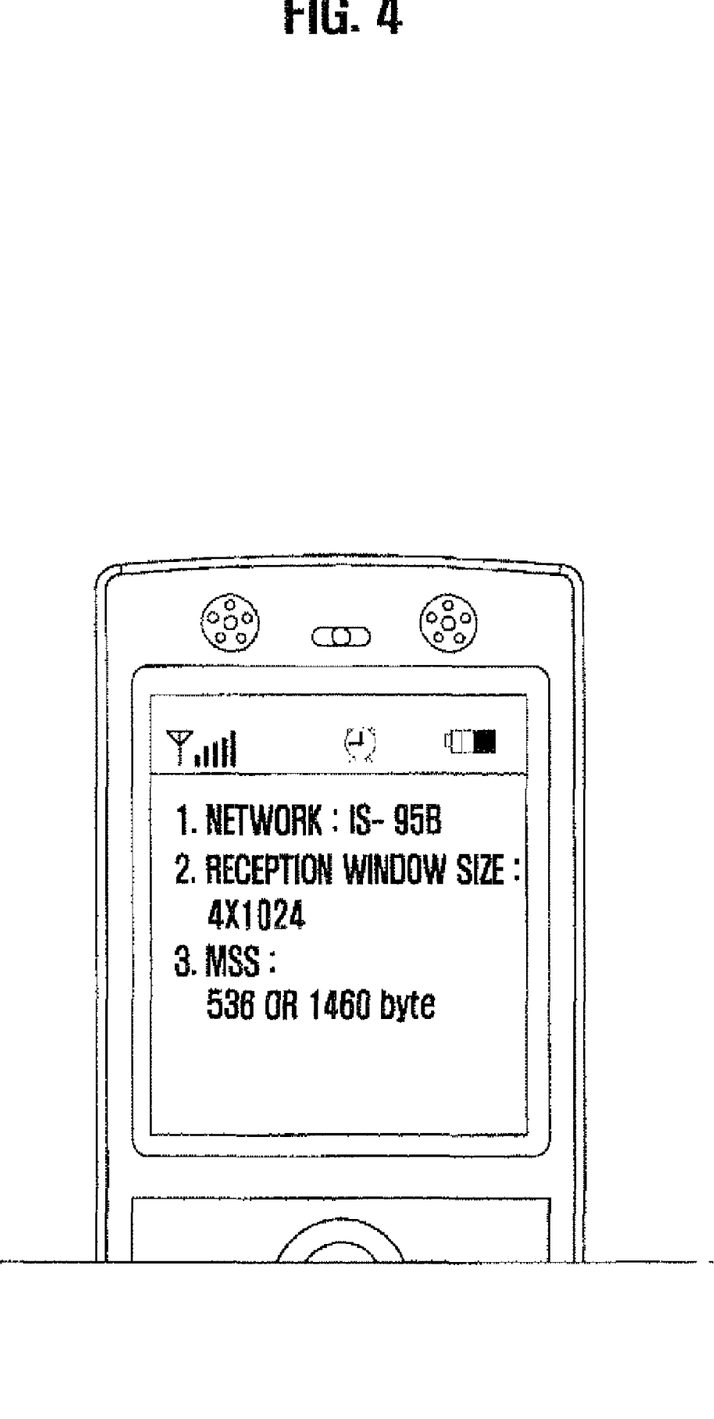
FIG. 4 is a view showing a screen image displaying information on a network in a data transport system according to an exemplary embodiment of the present invention.

The display unit 270 displays program execution screens and menu screens on the mobile terminal 200. The display unit 270 displays network information included in the system parameter Sys_Param received from the mobile communication network 100 when establishment of a communication channel is requested. As shown in FIG. 4, which is a view showing a screen image displaying network information, the network information includes the network type, the reception window size, and the message segment size.

The control unit 260 controls operations among the units in the mobile phone 200. That is, the control unit 260 controls interactions among the data processing unit 220, the audio processing unit 230, the keypad unit 240, the memory unit 250, and the display unit 270, such that the execution status of the supplementary functions and user data are displayed on the display unit 270 in response to the key signals input through the keypad unit 240.

The control unit 260 also controls automatic configuration of the mobile terminal 200 for optimal data transmission. For example, the control unit 260 extracts TCP parameters Tcp_Param from the system parameter Sys_Param received through the RF unit 210 and the data processing unit 220, and checks the window size and message segment size among the TCP parameters Tcp_Param. The control unit 260 establishes a data communication channel between the mobile terminal 200 and the mobile communication network 100 according to the window size value and message segment size value.

In the present invention, the window size value and message segment value received from the mobile communication network 100 determines the window size and message segment size. This may secure more stable data transmissions.

The control unit 260 also automatically configures a channel when the mobile terminal 200 performs a handover to another network operating in a different communication environment. In other words, the control unit 260 changes the current window size and message segment size into a new window size and message segment size appropriate for a new network.

Figure 5:
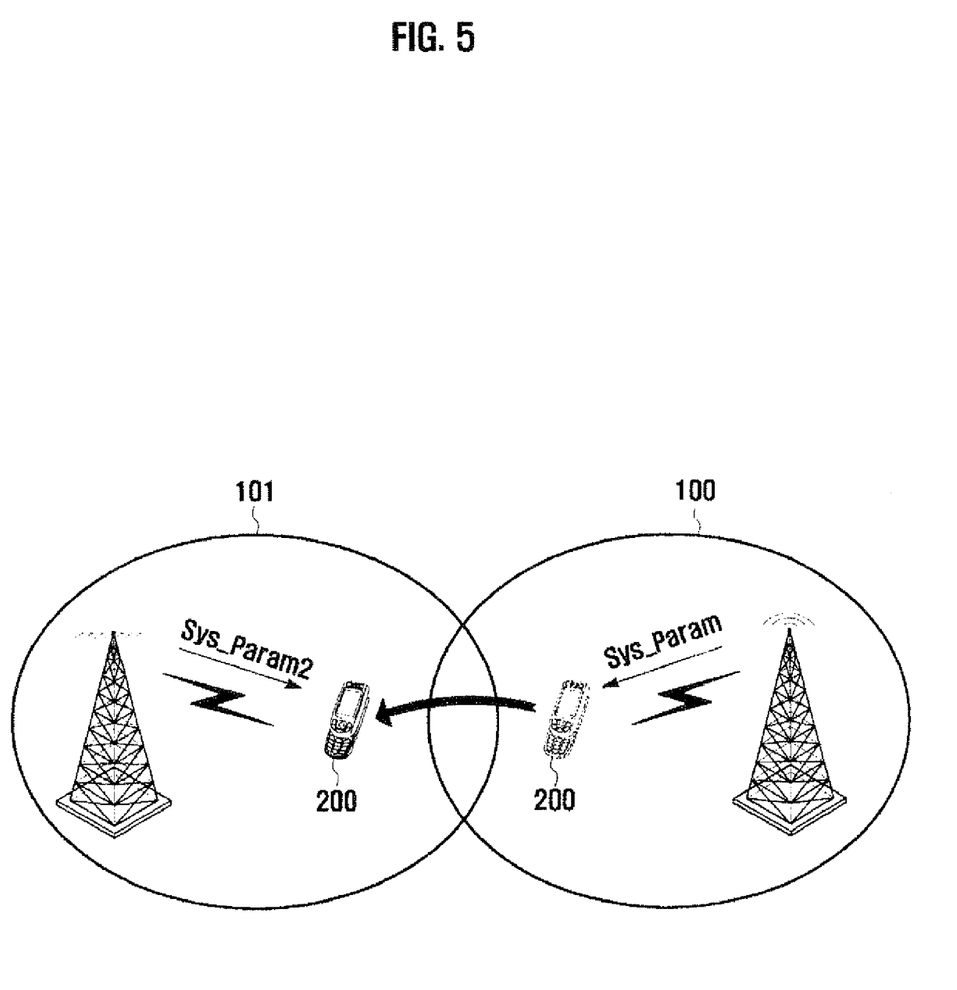
FIG. 5 is a schematic diagram showing a handover in an enhanced data transport system according to an exemplary embodiment of the present invention.
Figure 6:
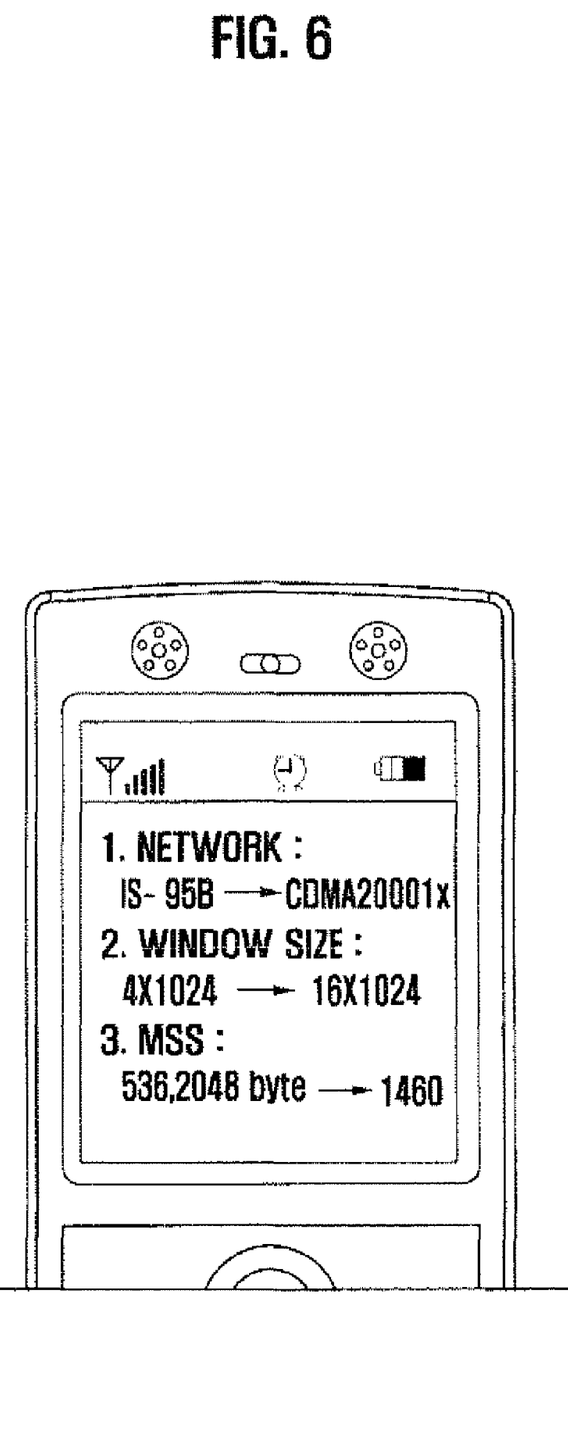
FIG. 6 is a view showing a screen image displaying information on changes of parameters in a data transport system according to an exemplary embodiment of the present invention.

FIG. 5 is a schematic diagram showing a handover in an enhanced data transport system according to an exemplary embodiment of the present invention. It is assumed that the mobile terminal 200 performs a handover from a first mobile communication network 100 to a second mobile communication network 101. Before making a handover decision, the control unit 260 of the mobile terminal 200 receives a first system parameter Sys_Param from the first mobile communication network 100 and establishes a data communication channel using a first window size and a first message segment size contained in the first system parameter. If movement of the mobile terminal 200 requires a handover, the control unit 260 of the mobile terminal 200 receives a second system parameter Sys_Param2 from the second mobile communication network 101 and establishes a data communication channel using a second window size and a second message segment size contained in the second system parameter Sys_Param2. After completing the handover, the mobile terminal 200 communicates data through the data communication channel established with the second communication network using the second window size and the second message segment size. As shown in FIG. 6, which shows the changes of parameters at this time, the control unit 260 controls the display unit 270 to display information regarding the changes of the network, window size, and message segment size.

Figure 7:
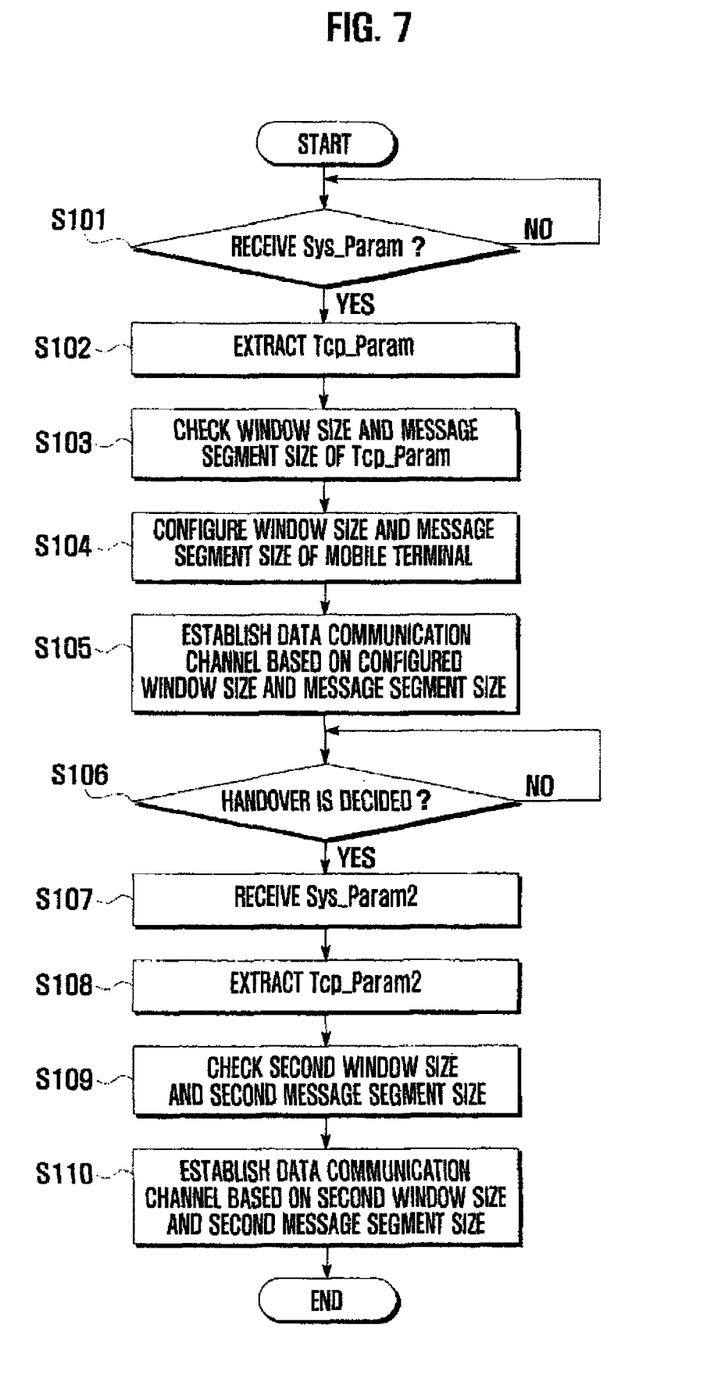
FIG. 7 is a flowchart showing an enhanced data transport method according to an exemplary embodiment of the present invention.
Figure 8:
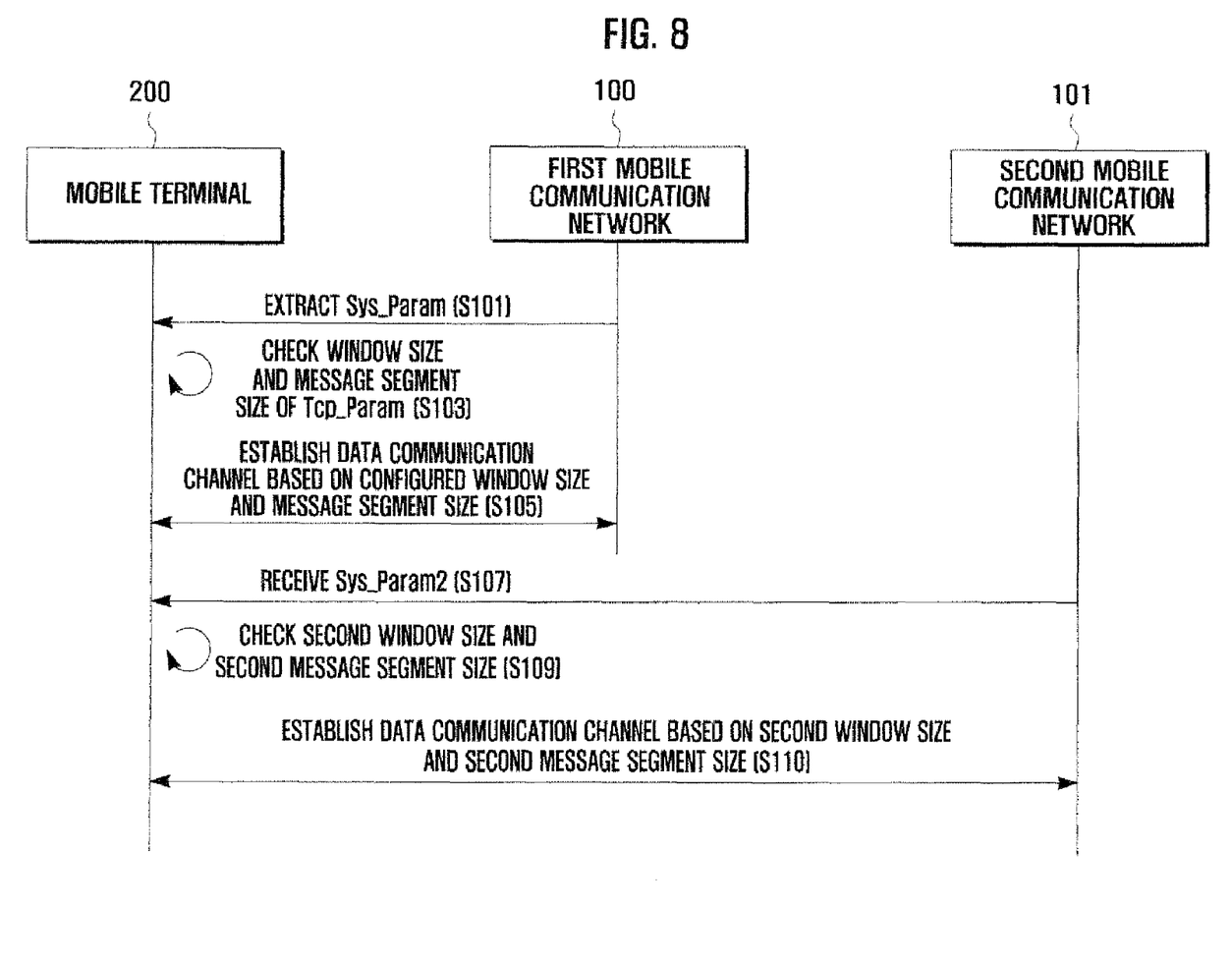
FIG. 8 is a message diagram showing message flows in the enhanced data transport method of FIG. 7.

An operation method of the above-structured data transport system is described hereinafter with reference to FIG. 7 and FIG. 8.

Once a mobile terminal 200 receives a system parameter Sys_Param from a first mobile communication network 100 (S101), the mobile terminal 200 extracts a TCP parameter Tcp_Param from the system parameter Sys_Param (S102).

At step S102, a control unit 260 of the mobile terminal 200 may include a data processing unit 220 for checking a Packet Zone Identification (PZID) and extracting the TCP parameter Tcp_Param from the PZID.

After extracting the TCP parameter Tcp_Param, the mobile terminal 200 checks the window size value and the message segment size value contained in the TCP parameter Tcp_Param (S103).

At step S103, the control unit 260 extracts information from a TCP header contained in the TCP parameter Tcp_Param and checks the window size and the message segment size contained in a TCP option field. The window size and message segment size may be used for stable data transmission in the mobile communication network 100.

The control unit 260 updates the window size and message segment size of the mobile terminal 200 with the window size value and the message segment size extracted from the system parameter Sys_Param transmitted by the first mobile communication network 100 (S104).

The updating process may be modified in accordance with the characteristics of the mobile communication network 100. For example, if the mobile terminal 200 uses a window size of 16×1024 and the mobile terminal network is an IS-95A or IS-95B network that supports a window size of 4×1024, the mobile terminal 200 sets the window size to 4×1024. The message size may be set as an option by the mobile communication network. After updating the window size and message segment size, the mobile terminal 200 establishes a data communication channel on the basis of the updated window size and message segment size (S105).

Accordingly, the mobile terminal 200 and the first mobile communication network 100 communicate with each other through the data communication channel.

If a handover becomes necessary while maintaining the data communication channel with the first mobile communication network 100 (S106), the mobile terminal 200 receives a second system parameter Sys_Param2 from a second mobile communication network 101, i.e. a handover target network (S107).

That is, if the mobile terminal 200 decides to perform a handover from the serving base station, i.e. the first mobile communication network 100, to a target base station, i.e. the second mobile communication network 101, the mobile terminal 200 receives the second system parameter Sys_Param2 from the second mobile communication network 101. If the second mobile communication network 101 is the same network as the first, the mobile terminal 200 may maintain the data transmission configuration.

Next, the mobile terminal 200 extracts a second TCP parameter Tcp_Param2 from the second system parameter Sys_Param2 S108 and checks a second window size and a second message segment size indicated by the TCP parameter Tcp_Param2 (S109).

The second window size and second message segment size are the ones defined in the second mobile communication network 101, and thus, the first window size and first message segment size may be maintained after completion of the handover if the first and second mobile communication networks 100 and 101 are homogenous networks. Even when the two mobile communication networks 100 and 101 are homogenous networks, the window size and message segment size may be updated if the second mobile communication network operates in a different environment, for example when the numbers of fixedly associated terminals of the homogenous networks differ from each other.

Consequently, the mobile terminal 200 establishes a data communication channel with the second mobile communication network 101 using the second window size and second message segment size (S110).

The control unit 260 of the mobile terminal 200 establishes data communication channel with the second mobile communication network 101 and configures actual data transmission.

The control unit 260 also controls the display unit 270 to display the changes in channel configuration in accordance with the handover, i.e. the changes of the network, window size, and message segment size.

As described above, the enhanced data transport system and method of the present invention may enable a mobile terminal to establish a communication channel that is adaptive to a communication environment and characteristics of a mobile communication network depending on system parameters received from the mobile communication network, thereby securing stable communication and improving transmission speed. Also, the enhanced data transport system and method of the present invention are advantageous in that a mobile terminal may dynamically check channel environments of neighboring networks and carry a handover to an optimal target network considering the channel environments.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for data transport in a mobile terminal, comprising:
    receiving a transmission control protocol parameter from a mobile communication network;
    configuring a data transmission scheme from the transmission control protocol parameter; and
    establishing a communication channel with the mobile communication network based on the data transmission scheme,
    wherein configuring a data transmission scheme comprises:
        checking at least one of a window size of the mobile communication network and a message segment size of the mobile communication network; and
        setting the at least one of the window size and the message segment size of the mobile communication network as a transmission parameter of the data transmission scheme.

2. The method of claim 1, wherein the transmission control protocol parameter is a system parameter defining a characteristic of the mobile communication network.

3. The method of claim 1, wherein the transmission control parameter comprises at least one of a transmission window size, a reception window size, and a message segment size.

4. The method of claim 1, further comprising displaying the transmission control protocol parameter.

* * * * *